United States Patent [19]

Pack

[11] Patent Number: 5,383,206
[45] Date of Patent: Jan. 17, 1995

[54] ERROR CORRECTING APPARATUS FOR IMAGE PROCESSING SYSTEM

[75] Inventor: Seung-Kwon Pack, Seoul, Rep. of Korea

[73] Assignee: Samsung Electronics Co., Ltd., Kyounggi-do, Rep. of Korea

[21] Appl. No.: 164,797

[22] Filed: Dec. 10, 1993

[30] Foreign Application Priority Data

Dec. 30, 1992 [KR] Rep. of Korea .............. 92-26637

[51] Int. Cl.$^6$ ........................................... H03M 13/00
[52] U.S. Cl. .................................................. 371/40.3
[58] Field of Search .............................. 371/40.3, 40.2

[56] References Cited

U.S. PATENT DOCUMENTS

| | | | |
|---|---|---|---|
| 4,532,629 | 6/1985 | Furuya et al. | 371/40.3 |
| 4,577,319 | 3/1986 | Takeuchi et al. | 371/40.3 |
| 4,951,284 | 8/1990 | Abdel-Ghaffar et al. | 371/40.3 X |
| 5,172,381 | 12/1992 | Karp et al. | 371/40.3 X |
| 5,202,890 | 4/1993 | Iketani et al. | 371/40.3 |
| 5,274,446 | 12/1993 | Ashida | 348/192 |

*Primary Examiner*—Stephen M. Baker
*Assistant Examiner*—Chuong D. Ngo
*Attorney, Agent, or Firm*—Antonelli, Terry, Stout & Kraus

[57] ABSTRACT

An error correcting apparatus for an image processing system is disclosed in which the amount of image information is restricted every period in order that an error caused during coding an input image signal by a variable length coding is reduced, and in which an error in the image signal can be corrected in the image processing system using a scrambling method so as to improve image quality.

1 Claim, 3 Drawing Sheets

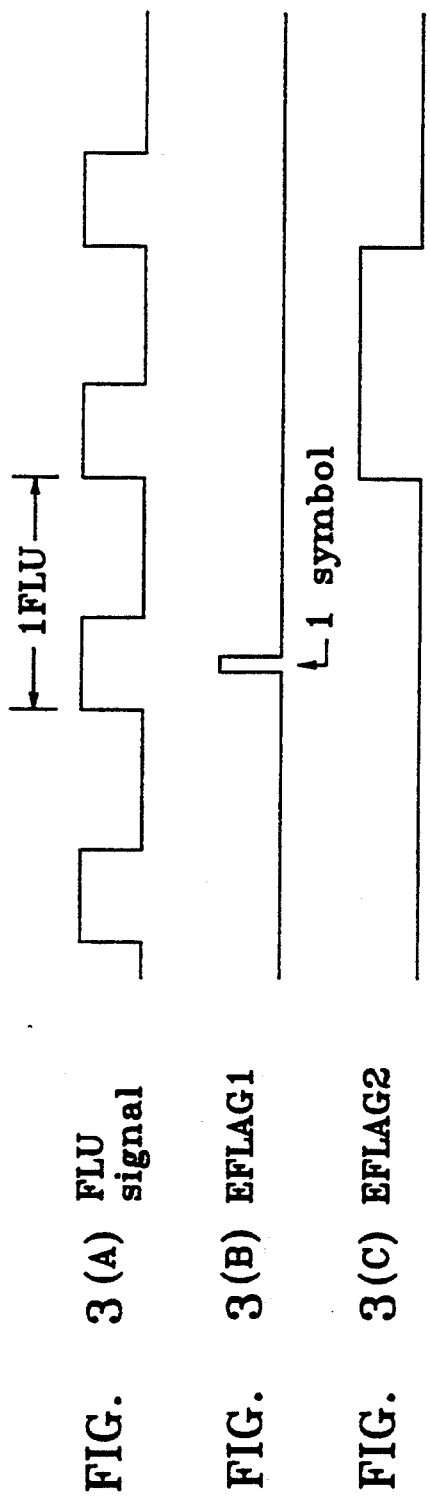
FIG. 3(A) FLU signal
FIG. 3(B) EFLAG1
FIG. 3(C) EFLAG2

ERROR CORRECTING APPARATUS FOR IMAGE PROCESSING SYSTEM

BACKGROUND OF THE INVENTION

1. Field of the invention

The present invention relates to an error correcting apparatus for an image processing system, and more particularly to an apparatus for correcting a coded image signal which is transmitted from an image coding system and in which an error signal is contained.

2. Description of the Prior Art

Generally, an image processing system is constituted by two main circuit parts, one of which is an image coding part for coding an image signal to generate a coded image signal, and the other of which is an image decoding part for decoding the coded image signal from the image coding part. When an image signal is transformed into a coded image signal by means of the image coding part, an error arises because of variation of power, circuit defect in the coding part, noises on transmitting lines and the like. Accordingly, the image coding part further has an error code generator in order to detect occurrence of error and generate an error correction code, and the image decoding part also has an error code decoder for decoding the error correction code in order to reproduce original image signal without error.

Since information of image signals are large in quantity, it is necessary to compress and transmit information of the image signals by means of an image coding system. Most of image coding systems which have been recently developed are a prerequisite to use a variable length coding method so as to effectively compress image information. By using the variable length coding method, image information can be effectively compressed, but when an error is generated in the compressed image information due to occurrence of noises on transmitting lines and the like, this error has a bad influence upon following image information, so that the compressed image information can not be reproduced near to original image information.

For this reason, most of image coding systems each have an error correction circuit, such as an error code generator, so as to reduce the frequency number in occurrence of error. However, since a burst error, which can not be corrected, can be risen even in such an error correction circuit, it is necessary to divide and transmit all the image information into the amount of information corresponding to every a predetermined period so as to reduce the range of information affected by an error. Therefore, even through an error arises, the error has an influence upon only a predetermined range of the divided image information, so that the range of image information affected by the error can be limited within the range corresponding to the divided image information of error occurrence. However, the smaller the range affected by an error, the lower the compression efficiency.

When the image information are compressed, good quality of image can be obtained only if all portions in the image have uniform image quality. in this case, the amount of compressed information is determined in accordance with each of the portions in the image.

In case that a variable length coding method is provided for coding image information, a method that the amount of coded image information make to be set equally every period by compulsion is utilized in such an image coding system. Generally, the amount of coded image information is small in portion where variation of image is relatively small, but large in portion where variation of image is relatively large. Accordingly, if the amount of coded image information is set equally every period by compulsion, quality of the image is seriously lowered in the portion where the variation is relatively large. As mentioned above, even through only a portion of the image is relatively distorted in image quality, as compared to other portions, it appears to human as if overall portions of the image are badly distorted because of characteristic of eyesight.

Therefore, if a scrambling method well-known in the art is provided for coding an image, which can rearrange image information to make all the portions in its image uniformly, image quality becomes uniform even if the amount of the coded image information is equally set every period, so that distortion of the image quality can be prevented.

SUMMARY OF THE INVENTION

It is the object of the present invention to provide an error correcting apparatus in which error position is detected in the image rearranged by a well-known scrambling, using an error flag from an error code decoding circuit, image information corresponding to the error position is substituted for image information of previous frame in which an error does not occur therein, so as to minimize reduction in the image quality.

According to the aspect of the present invention, the image processing system has two main circuit portions, which are capable of transmitting and receiving an image signal through a channel, one of which is an image coding circuit portion for coding the image signal to generate a coded image signal, and the other of which is an image decoding circuit portion for decoding the coded image signal applied through the channel, the image decoding circuit portion comprising:

error code decoder for decoding a coded error signal through the channel to produce an error flag signal having a symbol unit and a first vertical synchronizing signal;

image decoding means for decoding the coded image signal to produce a decoded image signal and a second vertical synchronizing signal;

error correcting means for correcting the de coded image signal in accordance with the error flag signal; and said error correcting means comprising a fixed length unit signal generator for generating a first fixed length unit signal and a second fixed length unit signal delayed by a predetermined fixed length unit as compared with the first fixed length unit signal; a delaying circuit preset by the second vertical synchronizing signal applied from said image decoding means, for saving the error flag signal from said error code decoder using the first vertical synchronizing signal applied from said error code decoder and outputting the error flag signal stored therein using the first fixed length unit signal; an error flag converter for converting the error flag signal into a second error flag signal having a fixed length unit; a write address generator for generating a first address signal in response to the second fixed length unit signal; a read address generator for generating a second address signal in synchronizing with the second vertical synchronizing signal; descrambling means for generating a third address signal corresponding to position rearranged by scrambling in response to the second address signal; an error flag memory for saving the second error flag signal using the first address signal and performing read operation by the third address signal so as to generate a third error flag signal corresponding to a descrambled image signal; an image signal memory for saving the decoded image signal from said image decoding circuit in accordance with the third error flag signal and outputting stored image signal in response to the second address signal; and a selector for selecting one of the decoded image signal from said image decoding circuit and the output image signal of said image signal memory in accordance with the third error flag signal.

BRIEF DESCRIPTION OF THE DRAWINGS

This invention may be better understood and its object and advantage will become apparent to those skilled in the art by reference to the accompanying drawings as follows:

FIGS. 3A to 3C are waveform diagrams of input/output signals in the error flag converter of the error correcting apparatus.

DESCRIPTION OF THE PREFERRED EMBODIMENT(S)

Figure 1:
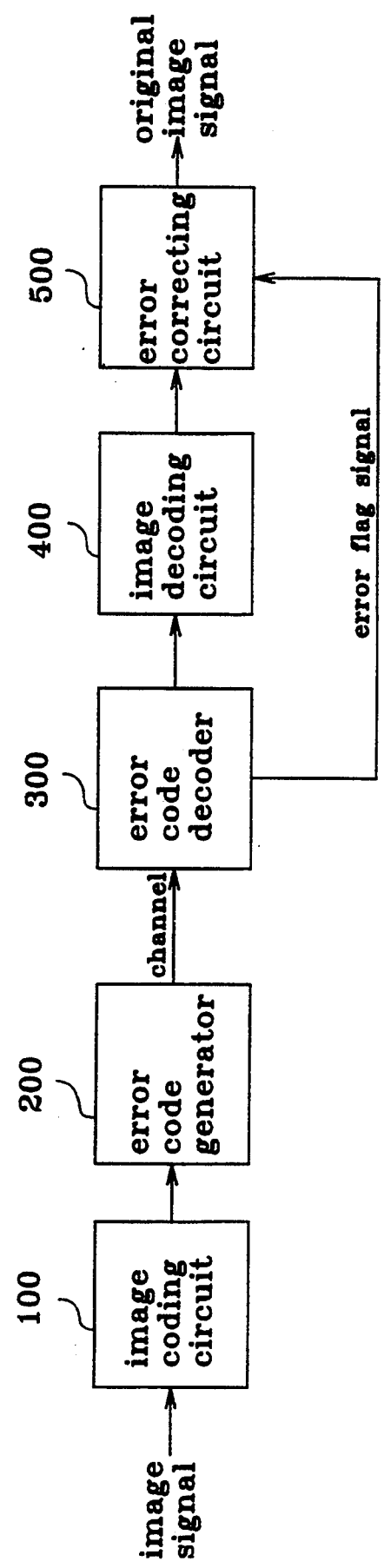
FIG. 1 is a circuit block diagram showing construction of an image processing system in which the error correcting apparatus according to the present invention is employed.

Referring to FIG. 1, an image processing system is constituted by two main circuit portions, one of which is an image coding circuit portion for coding an image signal to generate a coded image signal, and the other of which is an image decoding circuit portion for decoding the coded image signal from the image coding circuit part. Also, as shown in FIG. 1, the image coding circuit portion includes an image coding circuit 100 for coding the image signal to generate the coded image signal and an error code generator 200 for detecting error generated during coding the image signal to generate an coded error signal. The image decoding circuit portion includes an error code decoder 300 for decoding the coded error signal applied through a channel between the two circuit portions to generate an error flag signal, an image decoding circuit 400 for decoding the coded image signal to generate a decoded image signal and an error correcting circuit 500 for receiving the error flag signal and the decoded image signal and correcting the decoded image signal in accordance with the error flag signal to generate an original image signal without error.

In FIG. 1, the coded image signal applied through the channel therebetween is applied to the error correcting circuit 500 through the image decoding circuit 400, but the error flag signal applied from the error code decoder is directly applied to the error correcting circuit 500. in detail, since the coded image signal is decoded by the image decoding circuit 400 to be transformed into the decoded image signal, the error flag signal is applied to the error correcting circuit 500 faster than the decoded image signal. Accordingly, in order to match both of the error flag signal and the decoded image signal in synchronization, it is necessary to delay the error flag signal for a predetermined time. For this reason, the error correcting circuit 500 has a delaying circuit 501 so as to match the signals in synchronization, as shown in FIG. 2.

Figure 2:
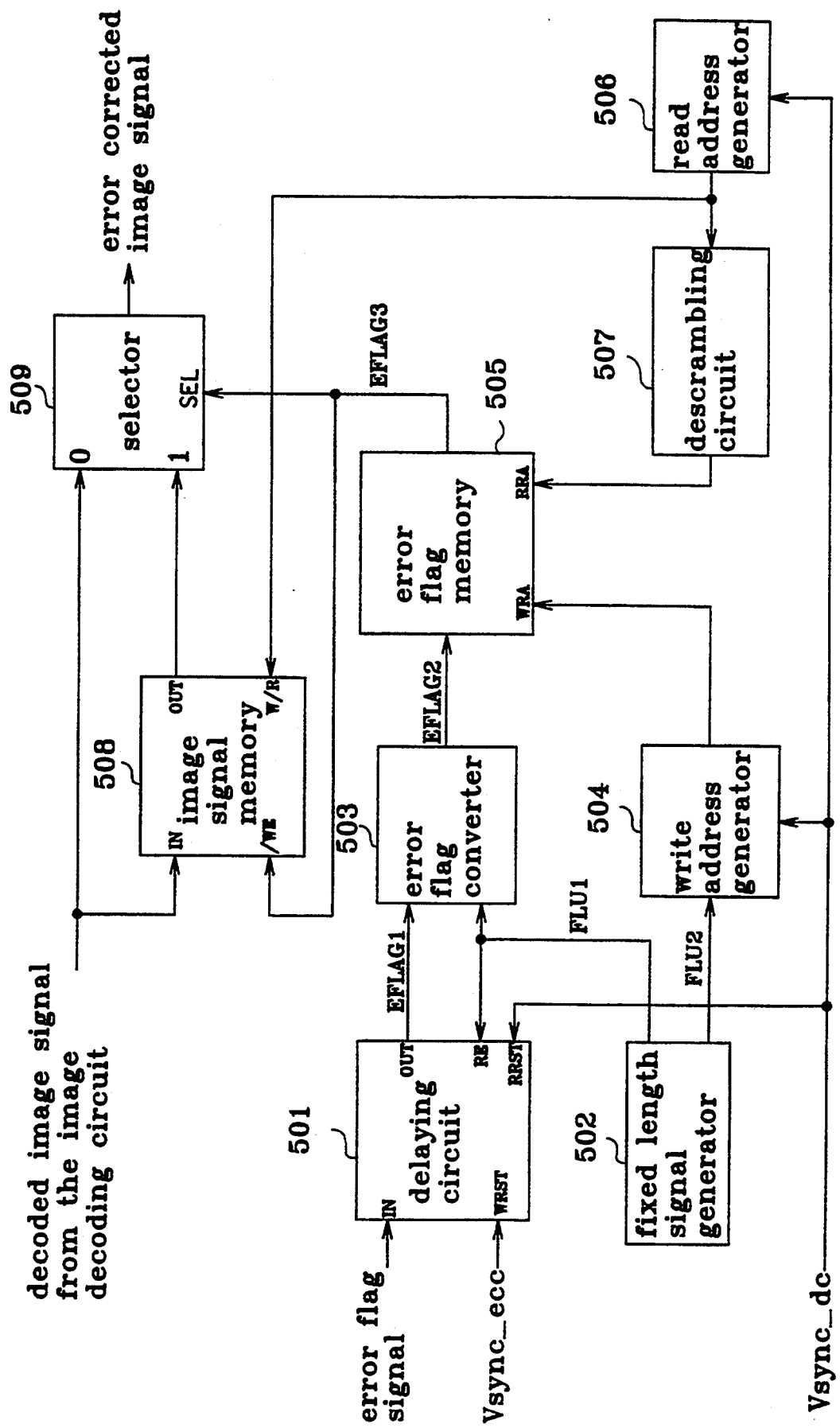
FIG. 2 is a detailed circuit diagram showing the error correcting apparatus according to the present invention.

With reference to FIG. 2, the delaying circuit 501 is constituted by an FIFO memory (fist-in first-out memory) for saving the error flag signal from the error code decoder 300 in accordance with a vertical synchronizing signal Vsync-ecc applied from the error code decoder 300. Also, the error flag signal stored in the delay circuit 501 is read in response to a first fixed length unit signal FLU1 applied from a fixed length unit signal generator 502 and is preset by a vertical synchronizing signal Vsync-dc applied from the image decoding circuit 400.

Turning to FIG. 1, in the image coding circuit 100, the coded image information are divided into the same amount every period, and the fixed length unit signal indicates time of each the divided image information having the same amount. Therefore, the delaying circuit 501 produces a first error flag signal EFLAG1 having one symbol in response to the fixed length unit signal FLU1, as shown in FIG. 3B.

Also, the first error flag signal EFLAG1, which is represented by one symbol unit shown in FIG. 3B, is applied to an error flag converter 503 to be converted to a second error flag signal EFLAG2, which is represented by a fixed length unit as shown in FIG. 3C. This is because, when an error is generated in at least one symbol of the fixed length unit signal as shown in FIG. 3A during coding the image signal by a variable length coding method in the image coding circuit 100, all information in the fixed length unit signal can be reproduced. As a result, the first error flag signal EFLAG1 is delayed as much as one fixed length unit period by means of the error flag converter and is output as the second error flag signal EFLAG2.

The vertical synchronizing signal Vsync-dc from the image decoding circuit 400 and a second fixed length unit signal FLU2 from the fixed length unit signal generator 502 are applied to a write address generator 504. Then, the second fixed length unit signal FLU2 is used as a clock signal of the write address generator 504. The write address generator 504 generates an address signal incremented by one in synchronizing with the clock signal and provides the incremented address signal to a write control terminal WRA of an error flag memory 505. The error flag memory 505 uses the incremented address signal as a write control signal, and thus stores the second error flag signal EFLAG2 in order. Also, the error flag memory 505 uses an output signal of a descrambling circuit 507 as a read control signal, and thus generates the second error flag signal stored in order therein as a third error flag signal.

On the other hand, a read address generator 506 generates an read address in synchronizing with the vertical synchronizing signal Vsync-dc. The read address is incremented by one in accordance with a pixel unit. The descrambling circuit 507 is constituted by an ROM ( read only memory ) which generates address signals corresponding to positions, where the pixels are rearranged by scrambling. Then, the third error flag signal EFLAG3 corresponding to a descrambled image signal can be read from the error flag memory 505 by the read control signal as the output of the descrambling circuit 507. Also, the third error flag signal EFLAG3 and a corresponding image signal have the same timing, and when an error is risen in the decoded image signal, the third error flag signal EFLAG3 is applied to a write disable terminal/WE of an image signal memory 508 in order that the decoded image signal can not be stored in the image signal memory. in addition, the third error flag signal EFLAG3 also is applied to a selecting terminal SEL of a selector 509, which is constituted by a multiplexer, in order to substitute the output image signal of the image signal memory 508 for the decoded image signal of previous frame, in which an error is risen. As described above, read operation of the image signal memory 508 always is risen regardless of occurrence of the error.

Therefore, even an image processing system using a variable length coding method and a scrambling method can effectively perform correcting for error generated during coding of image signal to minimize lowering in image quality due to occurrence of the error, if the apparatus has the error correcting apparatus according to the present invention. Also, the error correcting apparatus of the present invention can generate all control signals by using only first vertical synchronizing and error flag signals from the error code decoder, second vertical synchronizing and image signals from the image decoding circuit.

In addition, since a read address signal to simultaneously access data stored in the image signal memory and the error flag memory can be generated only one read address generator, the image processing system can be made compactly in its hardware size.

What is claimed is:

1. An image processing system having two main circuit portions, which are capable of transmitting and receiving an image signal through a channel, one of which is an image coding circuit portion for coding the image signal to generate a coded image signal, and the other of which is an image decoding circuit portion for decoding the coded image signal applied through the channel, the image decoding circuit portion comprising:

error code decoder for decoding a coded error signal through the channel to produce an error flag signal having a symbol unit and a first vertical synchronizing signal;

image decoding means for decoding the coded image signal to produce a decoded image signal and a second vertical synchronizing signal;

error correcting means for correcting the decoded image signal in accordance with the error flag signal; and said error correcting means comprising a fixed length unit signal generator for generating a first fixed length unit signal and a second fixed length unit signal delayed by a predetermined fixed length unit as compared with the first fixed length unit signal; a delaying circuit preset by the second vertical synchronizing signal applied from said image decoding means, for saving the error flag signal from said error code decoder using the first vertical synchronizing signal applied from said error code decoder and outputting the error flag signal stored therein using the first fixed length unit signal; an error flag converter for converting the error flag signal into a second error flag signal having a fixed length unit; a write address generator for generating a first address signal in response to the second fixed length unit signal; a read address generator for generating a second address signal in synchronizing with the second vertical synchronizing signal; descrambling means for generating a third address signal corresponding to position rearranged by scrambling in response to the second address signal; an error flag memory for saving the second error flag signal using the first address signal and performing read operation by the third address signal so as to generate a third error flag signal corresponding to a descrambled image signal; an image signal memory for saving the decoded image signal from said image decoding circuit in accordance with the third error flag signal and outputting stored image signal in response to the second address signal; and a selector for selecting one of the decoded image signal from said image decoding circuit and the output image signal of said image signal memory in accordance with the third error flag signal.

* * * * *